(12) United States Patent
Tackmann et al.

(10) Patent No.: US 11,396,794 B2
(45) Date of Patent: Jul. 26, 2022

(54) DEVICE TEMPERATURE GRADIENT CONTROL

(71) Applicants: Gunnar Tackmann, Hannover (DE); Tobias Kischkat, Celle (DE); Thomas Kruspe, Wietzendorf (DE); Peter Rottengatter, Celle (DE)

(72) Inventors: Gunnar Tackmann, Hannover (DE); Tobias Kischkat, Celle (DE); Thomas Kruspe, Wietzendorf (DE); Peter Rottengatter, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 150 days.

(21) Appl. No.: 16/417,897

(22) Filed: May 21, 2019

(65) Prior Publication Data

US 2019/0368314 A1 Dec. 5, 2019

Related U.S. Application Data

(60) Provisional application No. 62/677,240, filed on May 29, 2018.

(51) Int. Cl.
*E21B 36/00* (2006.01)
*E21B 47/07* (2012.01)
(Continued)

(52) U.S. Cl.
CPC ............ *E21B 36/001* (2013.01); *E21B 47/02* (2013.01); *E21B 47/06* (2013.01); *E21B 47/07* (2020.05); *G01C 19/00* (2013.01)

(58) Field of Classification Search
CPC .... E21B 36/001; E21B 47/01; E21B 47/0175; E21B 47/017; E21B 47/02; G01C 19/00
See application file for complete search history.

(56) References Cited

U.S. PATENT DOCUMENTS 4,712,306 A 12/1987 Cahill et al.
5,365,338 A 11/1994 Bramson
(Continued)

FOREIGN PATENT DOCUMENTS

EP 2487326 A1 8/2012
EP 2740889 A1 6/2014
(Continued)

OTHER PUBLICATIONS

Cao, et al.; "Optimized Design of the SGA-WZ Strapdown Airborne Gravimeter Temperature Control System"; 2015; MDPI, Basel Switzerland; Sensors; 13 pages.
(Continued)

*Primary Examiner* — Blake Michener
*Assistant Examiner* — Theodore N Yao
(74) *Attorney, Agent, or Firm* — Cantor Colburn LLP

(57) ABSTRACT

Systems and methods for measuring a parameter of interest in a borehole in an earth formation are provided. The systems include a downhole sensor having a first sensor component with a first temperature and a second sensor component with a second temperature, the downhole sensor disposed on a downhole component. A temperature control system is configured with a thermal control mechanism operatively connected to at least one of the first and second sensor components. The thermal control mechanism is configured to maintain a temperature difference between the first temperature and the second temperature below a pre-determined temperature difference. The downhole sensor is configured to measure the parameter of interest when the temperature difference is below the pre-determined temperature difference.

20 Claims, 4 Drawing Sheets

(51) Int. Cl.
*E21B 47/02* (2006.01)
*E21B 47/06* (2012.01)
*G01C 19/00* (2013.01)

(56) References Cited

U.S. PATENT DOCUMENTS

| | | | |
|---|---|---|---|
| 5,410,515 | A | 4/1995 | Bielas et al. |
| 5,931,000 | A | 8/1999 | Turner et al. |
| 6,347,282 | B2 | 2/2002 | Estes et al. |
| 6,778,908 | B2 | 8/2004 | Martorana et al. |
| 6,895,678 | B2 | 5/2005 | Ash |
| 6,918,186 | B2 | 7/2005 | Ash et al. |
| 7,093,370 | B2 | 8/2006 | Hansberry et al. |
| 7,308,795 | B2 | 12/2007 | Hall et al. |
| 7,571,770 | B2 | 8/2009 | Difoggio et al. |
| 8,826,984 | B2 | 9/2014 | Sanderlin et al. |
| 9,506,338 | B2 | 11/2016 | Difoggio |
| 9,617,828 | B2 * | 4/2017 | Marzouk ............... E21B 47/017 |
| 2006/0086506 | A1 | 4/2006 | Golla et al. |
| 2006/0162931 | A1 | 7/2006 | Mayes |
| 2006/0191682 | A1 * | 8/2006 | Storm ............... E21B 47/017 |
| | | | 166/250.01 |
| 2012/0152545 | A1 * | 6/2012 | Takeda ............... E21B 36/001 |
| | | | 166/302 |
| 2013/0226460 | A1 * | 8/2013 | Wu ............... G01K 1/20 |
| | | | 702/7 |
| 2014/0158429 | A1 * | 6/2014 | Kader ............... E21B 36/001 |
| | | | 175/40 |
| 2014/0169131 | A1 * | 6/2014 | Sinha ............... G01V 1/40 |
| | | | 367/31 |
| 2015/0204188 | A1 * | 7/2015 | Massam ............... E21B 47/22 |
| | | | 175/50 |
| 2016/0212883 | A1 * | 7/2016 | Kristensen ............ E21B 41/0007 |
| 2019/0017350 | A1 * | 1/2019 | Kusmer ............... E21B 47/07 |

FOREIGN PATENT DOCUMENTS

| | | | | |
|---|---|---|---|---|
| WO | | 2004013574 A2 | 2/2004 | |
| WO | WO-2011160046 A2 * | | 12/2011 | ............ H01L 23/473 |
| WO | WO-2014089128 A1 * | | 6/2014 | ............ E21B 47/017 |

OTHER PUBLICATIONS

International Search Report, International Application No. PCT/US2019/034341, dated Sep. 20, 2019, Korean Intellectual Property Office; International Search Report 4 pages.
International Written Opinion, International Application No. PCT/US2019/034341, dated Sep. 20, 2019, Korean Intellectual Property Office; International Written Opinion 8 pages.
Xia, et al.; "Microgyroscope Temperature Effects and Compensation-Control Methods"; Sensors 2009; ISSN 1424-8220; 28 pages.
Xu, et al.; "On-Chip Temperature-Control Technology for Silicon Micro-Gyroscope"; 2011; Trans Tech Publications; Key Engineering Materials; ISN: 1662-9795; 4 pages.

* cited by examiner

DEVICE TEMPERATURE GRADIENT CONTROL

CROSS REFERENCE TO RELATED APPLICATIONS

This application is a non-provisional application which claims the benefit of an earlier filing date from U.S. Provisional Application Ser. No. 62/677,240, filed May 29, 2018, the entire disclosure of which is incorporated herein by reference.

BACKGROUND

Various operations are performed by the energy industry to evaluate resource bearing formations and recover resources such as hydrocarbons. Such operations include drilling, directional drilling, directional surveying, stimulation and production. Various types of sensor devices, logging tools, directional control devices and other components are utilized by the energy industry for purposes such as hydrocarbon exploration and production.

Downhole devices can be exposed to harsh environmental conditions, such as high temperatures and pressures that can damage components and/or compromise sensing and other functions. For example, high temperature gradients can result in instabilities and inaccuracies in downhole sensor measurements.

BRIEF SUMMARY

Systems and methods for controlling thermal parameters of a device are provided. In some embodiments, the systems and methods may include a thermal control mechanism operably connected to the device, a measurement unit configured to at least one of directly measure a thermal gradient and estimate a spatial thermal gradient based on a difference between a first temperature of a first component of the device and a second temperature of a second component of the device, and a control unit configured to control the thermal control mechanism to at least one of reduce and stabilize the thermal gradient.

In some embodiments, the systems and methods may include a monitored device having a first component and a second component, the monitored device arranged to obtain downhole measurements and output a signal associated with the obtained downhole measurements, a measurement unit configured to at least one of directly measure a thermal gradient and estimate a spatial thermal gradient based on a difference between a first temperature of a first component of the device and a second temperature of a second component of the device, a first thermal control mechanism arranged in thermal contact with the first component and configured to adjust a temperature of the first component, a second thermal control mechanism arranged in thermal contact with the second component and configured to adjust a temperature of the second component, wherein the measurement unit is in operable communication with the first thermal control mechanism and the second thermal control mechanism, and a control unit configured to receive temperature measurements associated with the first component and the second component and control the first thermal control mechanism and the second thermal control mechanism independently of each other to at least one of reduce and stabilize the estimated thermal gradient.

In some embodiments, the systems and methods may include a monitored device arranged to obtain downhole measurements and output a signal associated with the obtained downhole measurements and a measurement unit configured to at least one of directly measure a thermal gradient and estimate a spatial thermal gradient based on a difference between a first temperature of a first component of the device and a second temperature of a second component of the device. The measurement unit is configured to derive a thermal profile based on the spatial thermal gradient to enable correction of the output signal to adjust for thermal impacts on the output signal.

In some embodiments, the systems and methods may include a monitored device arranged to obtain downhole measurements and output a signal associated with the obtained downhole measurements and a thermal control mechanism operably connected to the monitored device, wherein the thermal control mechanism includes a material comprising at least one of a solid, a liquid, and a phase-change material, wherein the material is selected to provide for heat transfer over an extent of the monitored device and thus provide at least one of control and minimization of thermal gradients over the monitored device.

In some embodiments, the systems and methods may include disposing the device in a selected environment, the device having a thermal control mechanism operably connected thereto, at least one of estimating, by a measurement unit, a spatial thermal gradient based on a difference between a first temperature of a first component of the device and a second temperature of a second component of the device and directly measuring a thermal gradient using the measurement unit, and at least one of directly measuring, with a measurement unit, a thermal gradient and estimating a spatial thermal gradient based on a difference between a first temperature of a first component of the device and a second temperature of a second component of the device, and controlling, by a control unit, the thermal control mechanism to at least one of reduce and stabilize the thermal gradient.

In some embodiments, the systems and methods may include disposing a monitored device in a selected environment, the monitored device arranged to obtain downhole measurements and output a signal associated with the obtained downhole measurements, at least one of estimating, by a measurement unit, a spatial thermal gradient based on a difference between a first temperature of a first component of the device and a second temperature of a second component of the device and directly measuring a thermal gradient using the measurement unit, and deriving, using the measurement unit, a thermal profile based on the spatial thermal gradient to enable correction of the output signal to adjust for thermal impacts on the output signal.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
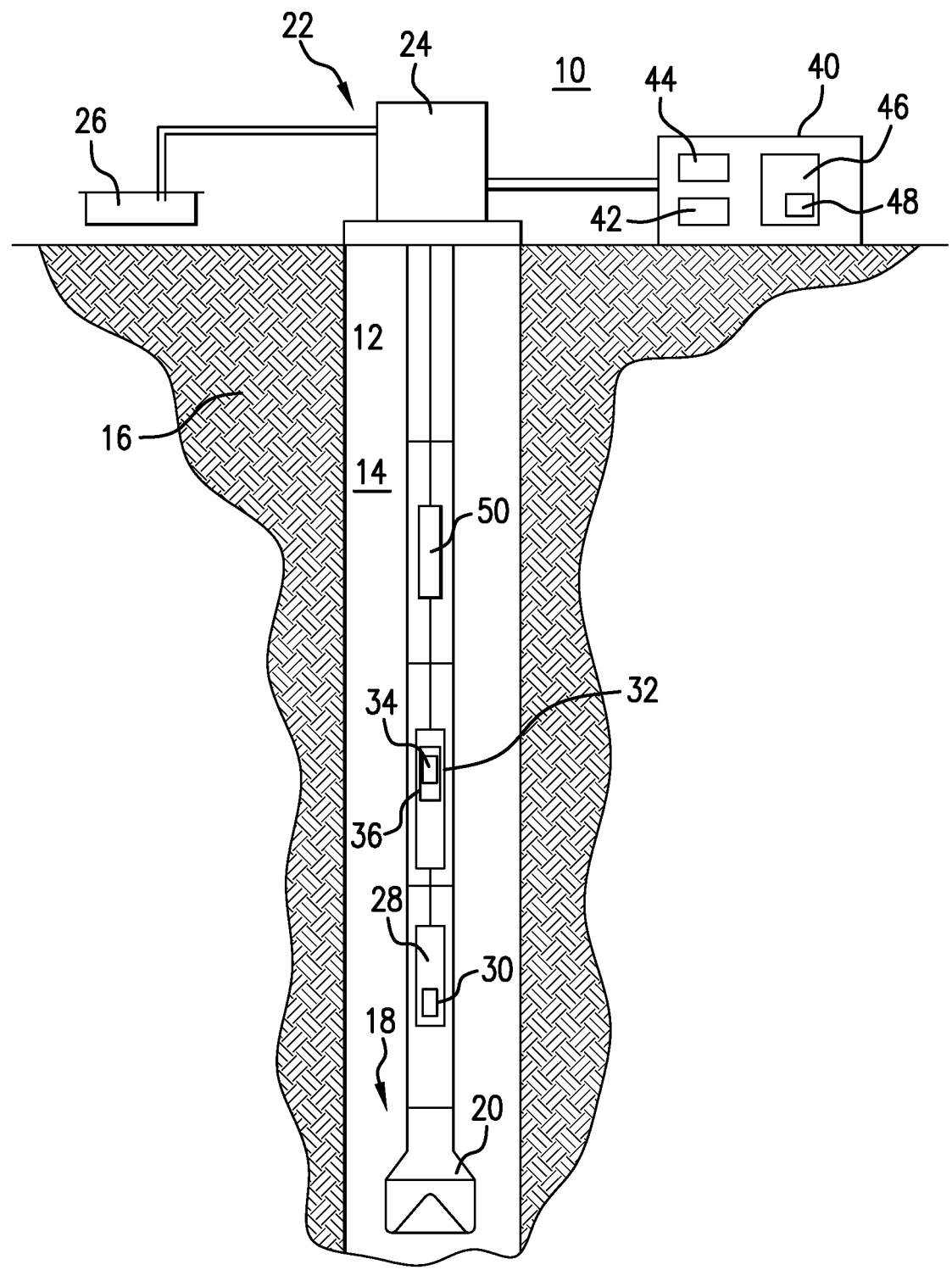
FIG. 1 depicts an embodiment of a well logging, production and/or drilling system.

Systems and methods are described herein for monitoring and controlling the temperature of a downhole sensor, such as a gyroscope. An embodiment of a temperature control system includes one or more temperature and/or temperature gradient sensors used to estimate a temperature at two or more different locations of the downhole sensor or a temperature gradient over a distance between two or more different locations in or on the downhole sensor or a temperature gradient from a first location of a first component of the downhole sensor to a second location of a second component of the downhole sensor. A control unit is configured to receive temperature data and/or estimate a spatial temperature gradient at the downhole sensor, and control the temperature of the downhole sensor to keep constant, reduce, or, at least, substantially eliminate a temperature gradient at the downhole sensor. In one embodiment, the system includes a first and a second temperature sensor for measuring temperature at two or more locations or components and estimating the spatial temperature gradient.

Temperature can be controlled to reduce the gradient by, for example, a fluid or solid material surrounding the downhole sensor and/or operation of one or more thermal control mechanisms at multiple locations/components of the downhole sensor. In another embodiment, the system employs a gradient sensor that measures a thermal gradient directly without subtracting individually measured temperatures of the first and second temperature sensors (i.e., without calculating the difference), and uses said control unit to reduce or eliminate such thermal gradient. The direct measurement of a thermal gradient may be implemented using any sensor or detector that is sensitive to heat flow, including, but not limited to, a thermocouple or Peltier module, by measuring strain on a device exposed to thermal stress, and/or optical sensors (such as an optical fiber including a Bragg-grating).

Various sensors, such as gyroscopes, may generate signals and/or data that are sensitive to temperature fluctuations which can impact the analysis of the received signal/data. For example, if a temperature or thermal gradient exists between one or more locations on a sensor or other device, such gradient can cause bias and/or scale factor issues, which are a results of temperature dependent outputs. Temperature difference of a few Kelvin (e.g., >3 K) may lead to significant measurement failures (bias and scale factor). Sensors often include electronics which apply temperature corrections to the sensor output data, depending upon the temperature of the electronics, such as an electronics component or electronics board. If the electronics board and the sensing portion of the sensor (e.g., sensor head) are at different temperatures, applied temperature corrections from the electronics board may not be accurate.

Accordingly, embodiments provided herein are directed to systems for thermally stabilizing downhole sensors by homogenizing gradients (e.g., minimizing, eliminating, or stabilizing thermal gradients). Thermal stabilization or reduction of temperature differences down to 0.01 K-1 K, or 1 K-3 K, or 2 K-4 K, or 3 K-5 K may be achieved in accordance with embodiments of the present disclosure. In some embodiments, the temperature control is achieved using a medium that surrounds and contacts all parts of the downhole sensor (e.g., all parts of sensor electronics, sensor heads, sensor housing, and/or components thereof). In some embodiments, the medium is electrically non-conductive and may be a solid, liquid, or phase-change material.

Temperature control of the downhole sensor may be performed while the downhole sensor is disposed in an environment that could affect temperature characteristics of the downhole sensors and potentially compromise operation of the downhole sensors. For example, temperature control can be performed in conjunction with a downhole sensors, such as a gyroscopic sensor, an electronics unit, and/or a monitoring device that is disposed in a resource bearing-formation (e.g., in a borehole in a hydrocarbon-bearing or other earth formation). That is, such sensors, electronics units, and/or monitoring devices (collectively "downhole sensors") may be disposed downhole and be subject to environmental and/or thermal conditions that can potentially affect or impact operation of the downhole sensors.

FIG. 1 illustrates an example of a system 10 that can be used to perform one or more energy industry operations. The system 10 in this example is a drilling system that includes a drill string 12 disposed in a borehole 14 that penetrates at least one earth formation 16. Although the borehole 14 is shown in FIG. 1 to be of constant diameter, those of skill in the art will appreciate boreholes are not so limited. For example, the borehole 14 may be of varying diameter and/or direction (e.g., azimuth, toolface, and/or inclination). The system 10 and/or the drill string 12 includes various downhole components or assemblies, such as a drilling assembly (including, e.g., a drill bit and mud motor) and various measurement tools and communication assemblies, one or more of which may be configured as a bottomhole assembly (BHA) 18. Although the system 10 is described as a drilling system, those of skill in the art will appreciate that downhole and/or energy industry systems can take various forms and/or configurations and thus include various downhole and/or surface tools and components. For example, such systems can include, but are not limited to, wireline or production systems and/or systems that can be used to perform various operations related to exploration, measurement, and/or production of hydrocarbons or other target resources located in earth formations (e.g., earth formation 16).

In one embodiment, the drill string 12 drives a drill bit 20 that penetrates the earth formation 16. Downhole drilling fluid, such as drilling mud, is pumped through a surface assembly 22 (including, e.g., a derrick, rotary table, or top drive, a coiled tubing drum, and/or standpipe) from a mud pit 26 or other source into the drill string 12 through the inner bore of the separate downhole components forming the drill string using one or more pumps 24. The downhole drilling fluid will return to the surface through the borehole 14.

The system 10 may also include a steering assembly 28 having components configured to steer the drill bit 20. The steering assembly 28, in one non-limiting embodiment and as shown, includes one or more biasing elements 30 configured to be actuated to apply lateral force to the drill bit 20 to accomplish changes in direction.

Various sensors may be disposed at or deployed with the system 10 for controlling and monitoring aspects of an operation or for formation evaluation. As such, the sensors may be disposed at the surface and/or downhole. The sensors, for example, can be configured to measure properties of the borehole 14, the earth formation 16, borehole fluid (both within a bore of the drill string 12 and/or in the annular space between the drill string 12 and a wall of the borehole 14), and/or the drill string. Examples of such sensors include, but are not limited to, discrete sensors (e.g., temperature and/or strain sensors) and distributed sensors (e.g., fiber optic temperature, strain, and/or acoustic sensors). Other examples of sensors include, without limitation, resistivity sensors, gamma ray sensors, nuclear sensors, calipers, seismic measurement tools, and/or orientation/directional sensors (e.g., magnetometers, accelerometers, gyroscopes, etc.). It is noted that the number and type of sensors described herein are exemplary and not intended to be limiting, as any suitable type and configuration of sensors can be employed to measure properties.

In one embodiment, the system 10 includes a directional measurement tool or assembly 32 configured to measure parameters related to the direction and/or orientation of the drill bit 20 and the drill string 12. The directional measurement assembly includes one or more downhole sensors 34, such as an accelerometer, magnetometer, gravimeter, strain sensor, gyroscopic sensor, and/or other direction sensor. Magnetometers measure the magnetic field of the earth and directional gyroscopic sensors may detect and measure an angular velocity. Gyroscopic sensors may be preferred for direction measurements in magnetic environments, such as magnetic downhole components or magnetic earth formations. Gyroscopic sensors may comprise mechanical gyroscopes, optical gyroscopes, ring laser gyroscopes, microelectromechanical systems gyroscopes (MEMS). MEMS gyroscopes are miniaturized gyroscopes found in electronics devices such as navigation systems, mobile phones, and oil field directional devices. The usage of gyroscopic sensors may replace magnetometer sensors and may improve the accuracy of downhole surveys. Accurate downhole surveys enable automatic trajectory control and geosteering and may improve well placement in hydrocarbon reservoirs.

Components of the system 10, such as the steering assembly 28, the directional measurement assembly 32 and various sensors, may be communicatively connected to one or more processing devices, which can be disposed at the surface and/or located at one or more downhole locations (e.g., within or along the drill string 12 and/or BHA 18). For example, a processing unit 40 is connected to one or more components via any suitable communication regime, such as mud pulse telemetry, electro-magnetic telemetry, wired links (e.g., hard wired drill pipe or coiled tubing), wireless links, optical links, or others. The processing unit 40 may be configured to perform functions such as controlling drilling and steering, transmitting and receiving data, processing measurement data, and/or monitoring operations of the system 10. The processing unit 40, in one embodiment, includes an input/output device 42, a processor 44, and a data storage device 46 (e.g., memory, computer-readable media, etc.) for storing data, models and/or computer programs or software 48. Other processing devices may be included downhole, such as downhole electronics 50, which can be in communication with the processing unit 40 located at the surface.

A temperature control system 36 is included for monitoring and controlling of temperature gradients of and/or in a device of the system 10. For example, as shown, the temperature control system 36 is shown associated with the downhole sensors 34, although other devices of the system 10 can include similar temperature control systems to that shown and described herein. The temperature control system 36 includes one or more temperature measurement units and a processing unit configured to receive temperature measurements from the one or more temperature measurement units and estimate a spatial temperature gradient in a device that is monitored by the temperature control system 36. As described herein, a "spatial temperature gradient" or "temperature gradient" relates to a difference in temperature between at least two different locations of the monitored device. The spatial temperature gradient may be a difference between temperatures at different locations, a rate of change of the temperature as a function of location, or any other measure of changes in temperatures among locations or components of the monitored device.

Differences in temperature may occur when the temperature of the environment of the downhole component is changing due to depth changes (e.g., increasing formation temperature with increasing depth) or due to downhole operations such as varying mud flow (e.g., varying flow rates, flow-off/flow-on) or tripping in the borehole or tripping out of the borehole. Also, internal heat sources may cause significant temperature differences between different components inside the downhole sensors. Electronics components dissipate energy provided by a power supply (e.g., battery or power supply unit). The dissipated energy may not be the same for all components in the downhole sensors which can lead to temperature differences between different components inside the sensor and/or to spatial temperature gradients. Electronics components in a gyroscope sensor (i.e., one type of downhole sensor), for example, provide stimulation signals to the sensor head, process output signals of the sensor head, and run through switching-on, switching-off cycles. All such electrical operations may cause temperature increases in an electronics board (Printed Circuit Board), while the sensor head is not changing its temperature accordingly. Spatial separation between the sensor head and a respective electronic board are typically between 5 mm and 100 mm. In rare cases, the separation may be larger than 100 mm, depending on where the downhole sensor is located in the downhole component and how the downhole sensor is designed.

In some embodiments, the temperature control systems of the present disclosure include mechanisms for providing control of thermal gradients of a device. Mechanisms for controlling thermal gradients can include mechanisms for reducing the spatial thermal gradients, mechanisms for substantially eliminating spatial thermal gradients, mechanisms for stabilizing thermal gradients, and/or mechanisms for compensating for an estimated thermal gradient via data analysis and/or signal processing. For example, one or more thermal control mechanisms, such as heat sinks or thermoelectric coolers (TECs), can be attached to respective parts and/or components of a monitored device so that the temperature of each component or part can be individually controlled. Such control can enable stabilization, reduction, and/or elimination of a spatial thermal gradient at or on the component or part of the device. In another example, the monitored device can be encased or encapsulated within a solid or fluid material (e.g., submerged within a fluid material) that is thermally conductive, with the material being passively or actively controlled to thus control a thermal gradient and/or temperature of the monitored device and stabilize, reduce, or eliminate thermal gradients or temperature differences in or on the device.

In some embodiments, the device may not be actively monitored, but mechanisms described here can be employed to passively stabilize, reduce, or eliminate thermal gradients. Passive stabilization does not require a source of power (e.g., remote power source, dedicated power supply, etc.). In various of the above described embodiments, the fluid material may be selected to undergo a phase-change (e.g., paraffin, water, or alcohol) in order to improve thermal gradient control. As such, the mechanisms employed herein can be optimized for various applications, including specific thermal gradient control based on characteristics and/or properties of the elements of the temperature control systems.

In one example embodiment, such as active temperature control systems, the temperature control system includes a processing unit that can adjust data received from a monitored device based on and/or to account for an estimated temperature gradient. For example, an analysis unit (e.g., the processing unit 40 shown in FIG. 1) can be configured to correct or adjust output data or signals such as measurement data from the monitored device based on an estimated temperature gradient. That is, the when the device outputs measurement data, the thermal gradient data can be used to correct the measurement data output from the device. In some embodiments, the processing unit may be located within the downhole component within the borehole. The downhole component may also comprise a memory for storing measured data and processing parameters, correction parameters, calibration parameters, processing instructions/algorithms, set points, and/or look-up tables.

Example temperature control systems of the present disclosure are described further below in conjunction with a sensor (e.g., "monitored device") configured to perform measurements downhole, however the temperature control systems are not so limited and can be used with any kind of device for which temperature control or thermal gradient control is desired.

Figure 2:
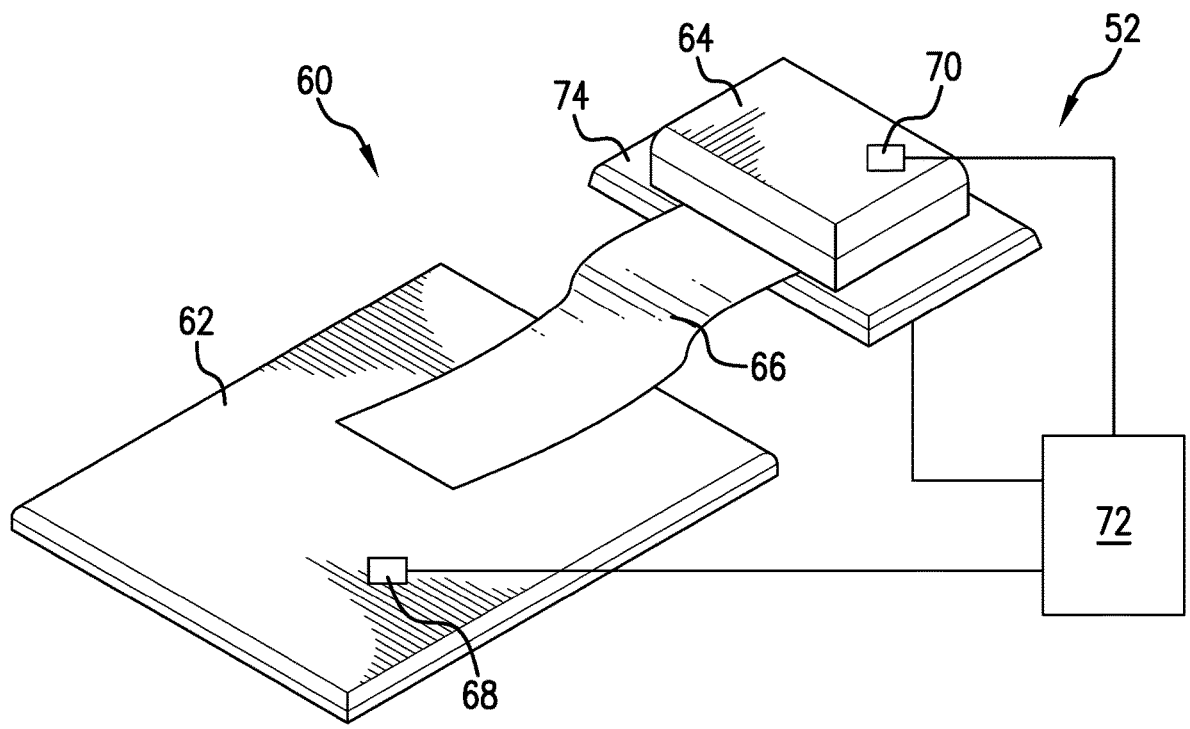
FIG. 2 depicts an embodiment of a temperature control system including a thermal control mechanism connected to a components of a downhole sensor.

FIG. 2 shows aspects of an embodiment of a temperature control system 52 configured for use with a downhole sensor 60, such as an electronic sensor device (e.g., a gyroscopic sensor). The downhole sensor 60 includes multiple components, such as first sensor component 62 (e.g., a printed circuit board (PCB), a Multiple Chip Module (MCM), or high temperature electronics) and a second sensor component (e.g., a sensor head) holding or supporting, e.g., the actual gyroscope. The first and second sensor components 62, 64 are connected by a conductor 66, such as a flex cable although other electrical or electronic connectors may be employed without departing from the scope of the present disclosure. The temperature control system 52 includes a first temperature sensor 68 configured to measure a temperature of the first sensor component 62 and a second temperature sensor 70 configured to independently measure a temperature of the second sensor component 64. In one non-limiting embodiment, the first temperature sensor 68 and the second temperature sensor 70 form, at least a part of, a measurement unit for measuring a parameter representative of a temperature difference between a first temperature of the first sensor component 62 and a second temperature of the second sensor component 64. In some embodiments a measurement unit may be arranged to determine a temperature gradient between the first sensor component and the second sensor component.

Temperature measurements may be transmitted from the measurement unit (e.g., temperature sensors 68, 70) to a measurement and/or control unit 72, the measurement and/or control unit 72 having a processor and/or other electronic elements, components, etc. The measurement and/or control unit 72 can perform functions such as estimating a spatial temperature gradient between the first sensor component 62 and the second sensor component 64 by calculating the difference between temperature measurements received from the first and second temperature sensors 68, 70 at a given time. Although shown in FIG. 2 with a single measurement and/or control unit 72 (i.e., illustrated as a single structure), those of skill in the art will appreciate that in some embodiments, the temperature measurement and control aspects may be realized in separate structural components (e.g., as different circuits or electronic devices).

In another embodiment, the measurement unit may provide a parameter representative of a difference between the first temperature of the first sensor component and the second temperature of the second sensor component and/or the temperature gradient between the first sensor component and the second sensor component to a monitoring unit. The monitoring unit may be a processor configured to monitor the representative parameter or a human operator. The representative parameter measured by the measurement unit may be used to monitor the temperature difference between the first sensor component and the second sensor component for at least one of a temperature monitoring purpose, a data quality monitoring purpose (e.g., quality of downhole sensor output data), and/or a temperature correction purpose (e.g., correcting downhole sensor output data for temperature differences in the downhole sensor). In some embodiments, the representative parameter measured by the measurement unit is not input to the controlling unit to be used as controlling parameter and is not used to control the thermal control mechanism. Other functions of the measurement and/or control unit 72 can include independently controlling the temperature of one or both components of the downhole sensor 60 (e.g., first sensor component 62 and/or second sensor component 64).

For example, as shown in FIG. 2, a first thermal control mechanism 74, such as a thermoelectric cooler (TEC), is arranged in contact with or otherwise in thermal communication with the second sensor component 64 and can be controlled to raise or lower the temperature of the second sensor component 64 so that a difference between the temperatures of the second sensor component 64 and the first sensor component 62 may be stabilized, reduced, minimized, or eliminated. Stabilization to a predetermined gradient (or predetermined temperature difference) which is non-zero may be relatively easy to achieve and may be effective and efficient from an energetic point of view. As will be appreciated by those of skill in the art TECs can be used for cooling, heating, or both cooling and heating, and thus the term "thermoelectric cooler" or "TEC" is not intended to imply only cooling, but rather refers to a thermoelectric device or component that is capable of adjusting temperatures (e.g., heat or cool).

Thermoelectric coolers use the Peltier effect to create a heat flux between the junction of two different types of materials. A Peltier cooler, heater, or thermoelectric heat pump is a solid-state active heat pump which transfers heat from one side of the device to the other, with consumption of electrical energy, depending on the direction of the current. Such an instrument is also called a Peltier device, Peltier heat pump, solid state refrigerator, or thermoelectric cooler (TEC). It can be used either for heating or for cooling, although in practice the main application is cooling. It can also be used as a temperature controller that either heats or cools. A thermoelectric cooler can also be used as a thermoelectric generator. When operated as a cooler, a voltage is applied by a power supply across the device, and as a result, a difference in temperature will build up between the two sides. When operated as a generator, one side of the device is heated to a temperature greater than the other side, and as a result, a difference in voltage will build up between the two sides (i.e., the Seebeck effect). TECs may have one or more stages.

The control of the thermal control mechanism is based on a temperature reference. The temperature reference can be a predefined temperature, a current temperature of one of the components of the downhole sensor (e.g., electronics board or sensor head), or a temperature difference between two components of the downhole sensor. In response to providing the thermal control mechanism a reference temperature value, the thermal control mechanism may increase or reduce the temperature at at least one component of the components of the downhole sensor. In an example case, the thermal control mechanism may reduce the temperature difference or the temperature gradient to zero. In some embodiments, it may be beneficial to control the temperature difference or temperature gradient to achieve and maintain at a predefined temperature difference. In yet another embodiment, the thermal control mechanism may maintain the temperature difference or the temperature gradient within a particular temperature difference range or temperature gradient range, such as for example 0.1 K-0.5 K, 0.5 K-1 K, or 1 K-2 K, or 2 K-4 K, 4 K-8 K (2.5 K/m-12.5 K/m, 12.5 K/m-25 K/m, 25 K/m-50 K/m, 50 K/m-100 K/m, 100 K/m-200 K/m).

Figure 3:
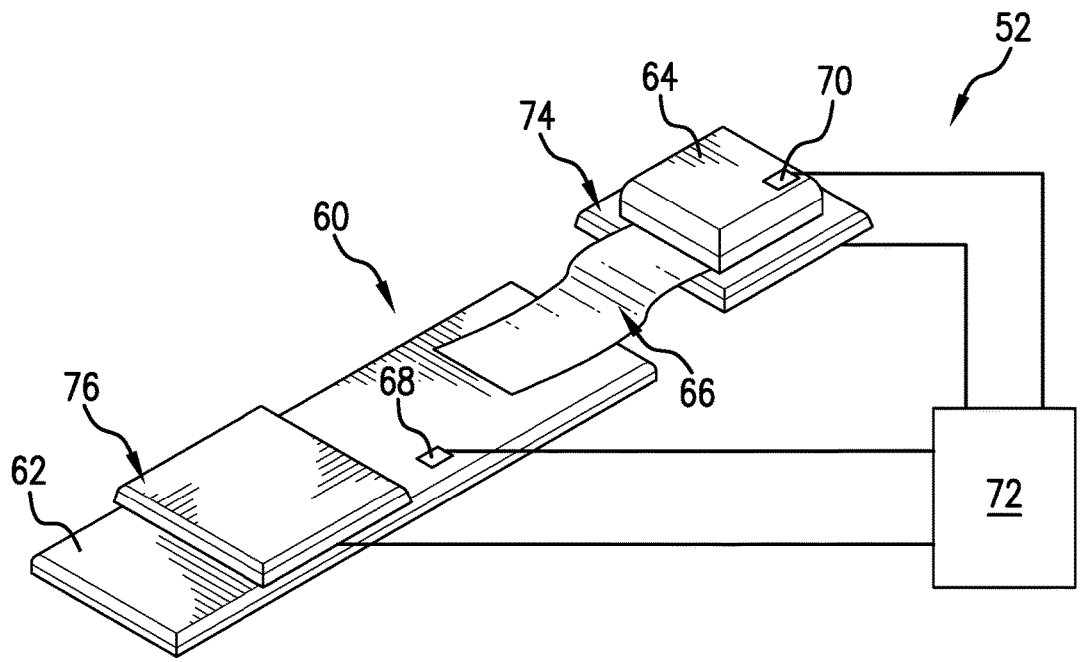
FIG. 3 depicts an embodiment of a temperature control system including thermal control mechanisms connected to multiple components of a downhole sensor.

Turning now to FIG. 3, in this embodiment, multiple thermal control mechanisms 74, 76 can be connected in thermal communication with respective components so that the temperature of components can be individually controlled to reduce temperature gradients. For example, the temperature control system can include a second thermal control mechanism 76, such as a second TEC. The measurement and/or control unit 72 may be configured to control the temperature of one or both of the first sensor component 62 and the second sensor component 64.

Figure 4:
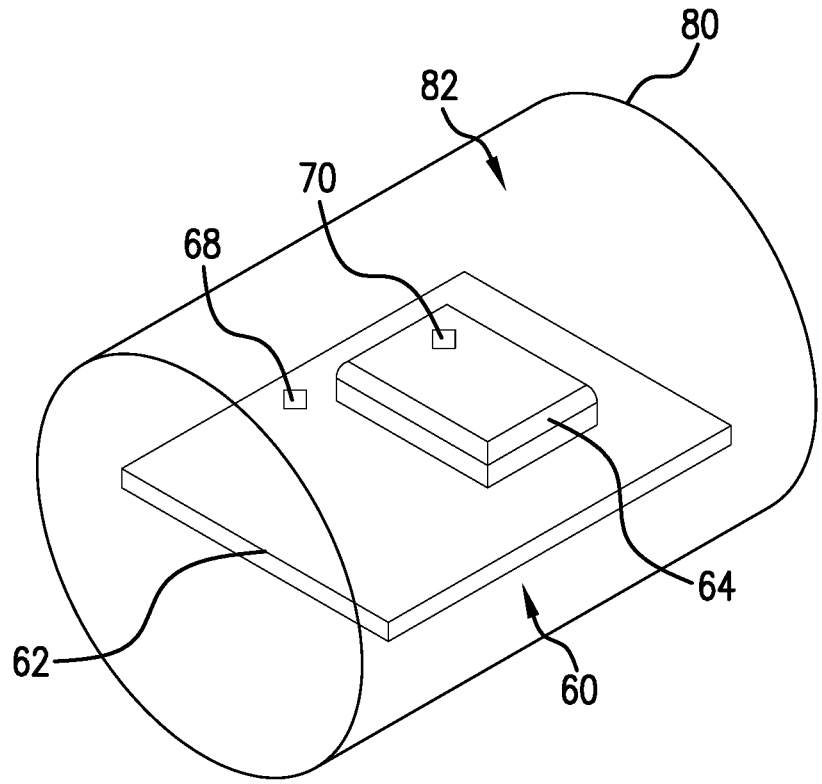
FIG. 4 depicts an embodiment of a temperature control system including a temperature control medium surrounding a downhole sensor.

Referring to FIG. 4, in one embodiment, spatial temperature gradients in the downhole sensor 60 can be controlled, stabilized, reduced, minimized, or eliminated by encapsulating the downhole sensor 60 in a heat-transfer medium 82. For example, the downhole sensor 60 is disposed within a sensor container 80 that is partially or completely filled with a heat-transfer medium 82, which may be a fluid or solid medium. For example, the heat-transfer medium 82 may be an electrically non-conductive oil or electrically insulating solid (e.g., a ceramic). In one embodiment, the medium 82 surrounds and can come into contact with all or substantially all of the external surfaces of the downhole sensor 60. In this way, the temperature of the downhole sensor 60 can be at least substantially homogenized by transferring heat from one component to another.

In the example of FIG. 4, the sensor container 80 is filled with an electrically non-conductive liquid that surrounds and touches all parts of the sensor electronics, sensor head, and sensor housing. In another embodiment, the liquid or solid medium may be electrically conductive. Electrically conductive materials commonly possess good thermal conductivity. Employing an electrically conductive medium may require isolation of electric components by a non-conductive coating, packaging, and/or protection (e.g., epoxy coating, silicon coating, parylene coating, etc.).

The sensor container 80 may be located inside a collar of a downhole component, or inside the inner bore of a downhole component inside a container in the drilling mud (e.g., a probe design) or in a non-rotating sleeve of a steering assembly. In some non-limiting embodiments, for example, the sensor container 80 may have only a few cubic centimeters of volume (e.g., 3 cm$^3$ to 10 cm$^3$) and inner dimensions of a couple of millimeters (e.g., 15 mm to 25 mm).

The medium 82, in one embodiment, is electronically non-conductive and can be, e.g., a thermally conductive liquid, a solid, or a phase-change material. If the medium 82 is a liquid (fluid), such as polyglycol or liquid metal, thermal homogeneity may be achieved using thermal conductance and/or convective flow of heat between the liquid and the sensor components. The liquid can be pumped, using a pumping device, around the sensor components in order to optimize temperature homogeneity throughout the liquid. In some embodiments, an agitator, such as a propeller, a paddle, or a plunger may be used to mix the liquid in order to transport heat. Additionally, in some configurations, superposed liquid convection driven by temperature differences in the liquid may promote heat transfer and temperature difference compensation.

In some embodiments, a liquid reservoir with a temperature different to the temperature of the liquid (e.g., colder liquid) surrounding the downhole sensor may be utilized. The liquid from the liquid reservoir may be circulated from the liquid reservoir to the downhole sensor and back into the reservoir. The liquid reservoir may be connected by flow tubes to a cavity in which the downhole sensor is located. The liquid reservoir may be temperature controlled in order to either cool or heat the reservoir liquid depending on which temperature is desired at the downhole sensor. Liquid metals with thermal conductivity coefficients in the area of tens to hundreds of W/mK suited for cooling purposes are, for example and without limitation, Galinstan, Alkali Metal Alloys, Cesium Alloys ($Cs_{77}K_{23}$), NaK Alloys ($K_{78}Na_{22}$), or Lead.

In one embodiment, the liquid can inherently serve as a rotatable heat transmission medium. For example, the downhole sensor 60 may be a gyroscopic sensor supported by a suitable support structure so that the downhole sensor 60 can be rotated inside the liquid with a rotating motor. The motor itself can be positioned outside the sensor container 80 or inside of the sensor container 80 and within the liquid.

The liquid can have a high thermal capacity and thus act as a low-pass filter for rapid environment temperature changes, and for damping heat generated by the downhole sensor 60. This effect can be used, e.g., during flow-off surveys when not enough power is available for temperature-stabilizing the liquid or no power may be provided by a power supply of the downhole component.

If the medium 82 is a solid (e.g., aluminum, copper, aluminum nitride ceramics, silicon carbine ceramics, etc.), thermal homogeneity can be achieved using thermal conductance between the solid and components of the downhole sensor 60. The solid can also have a high thermal capacity and thus act as a low-pass filter as discussed above.

Figure 5:
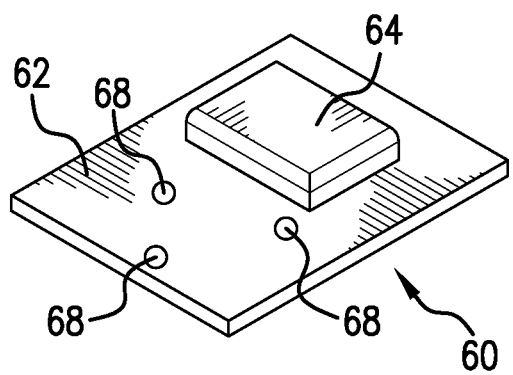
FIG. 5 depicts an embodiment of a temperature control system including a plurality of temperature sensors arranged on a downhole sensor.

Turning now to FIG. 5, an illustration of a downhole sensor 60 having a plurality of first temperatures sensors 68 is shown. The first temperatures sensors 68 can be connected in thermal communication with a first sensor component 62 and located at different positions to measure temperatures at the respective different positions on the first sensor component 62. Although not shown, the first temperatures sensors 68 may be operably connected to a measurement and/or control unit as shown and described above. The measurement and/or control unit can then control a thermal control mechanism to adjust a temperature at one or more locations on the first sensor component 62. Although shown with multiple first temperatures sensors 68 located and positioned on the first sensor component 62, in other embodiments one or more second temperatures sensors can be arranged on the second sensor component 64.

Figure 6:
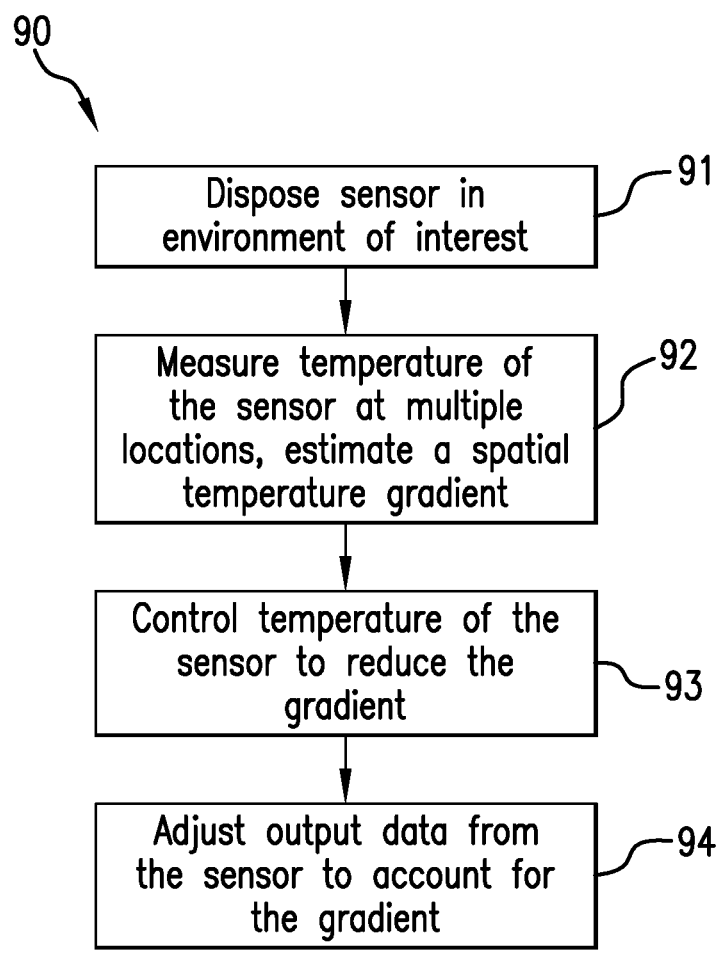
FIG. 6 is a flow chart depicting aspects of a method of controlling the temperature of a downhole sensor.

FIG. 6 illustrates a method 90 of controlling temperature and/or accounting for temperature gradients in a monitored device. The method 90 may be used in conjunction with the system 10 and/or the downhole sensor 60, although the method 90 may be utilized in conjunction with any suitable type of device for which temperature control is desired. The method 90 includes one or more stages 91-94. In one embodiment, the method 90 includes the execution of all of stages 91-94 in the order described. However, certain stages may be omitted, additional stages may be added, and/or the order of the stages may be changed.

In the first stage 91, a device such as the downhole sensor 60 is disposed in an environment of interest, such as in the borehole 14 shown in FIG. 1. For example, an energy industry operation, such as a drilling operation, is performed. A drill string including the downhole sensor 60 is deployed in a borehole and sensor readings from the downhole sensor 60 are used to estimate directional characteristics, which can be used to control operational parameters such as drilling direction.

In the second stage 92, the temperature of the downhole sensor 60 at multiple locations is measured. For example, the temperature of the second sensor component 64 and the temperature of the first sensor component 62 are measured at the same time or within a selected time period (e.g., during which the temperature of the surrounding environment is not expected to substantially change). The difference between the measured temperatures is calculated and a spatial temperature gradient is estimated therefrom.

In the third stage 93, if the temperature gradient exceeds a selected value or threshold, the temperature of one or more components is controlled to reduce or stabilize the gradient to a desired level. In some embodiments, set points of all temperature controlled components can be chosen to have a constant (or zero) gradient. Set points are the desired or predetermined values of the controlled components. Temperature control can also be applied to the whole downhole sensor 60 at once.

In one embodiment, one or more thermal control mechanisms such as TECs at one or multiple locations are controlled to change the temperature at one or more locations and reduce or stabilize the gradient. In another embodiment, temperature is controlled via a solid or fluid medium encapsulating the downhole sensor 60. Temperature of the medium can be controlled, e.g., by controlling the flow rate of fluid and/or by applying a heat sink or TEC to a liquid or solid.

In the fourth stage 94, if a temperature gradient still exists (e.g., because the gradient is not completely mitigated by temperature control of the downhole sensor 60, or because direct temperature control of the downhole sensor 60 is not performed or available), output data is corrected based on the estimated temperature gradient.

For example, signals or data from the downhole sensor 60 (e.g., gyroscope rate data or other measurement data) can be corrected using temperature readings and derived gradients, and higher temperature spatial derivatives.

In one embodiment, output data is corrected using the following process. The temperature of multiple components is measured, and temperature gradients are estimated. Higher temperature spatial derivatives may also be derived. Expected output values based on the estimated temperature gradient and/or derivative are calculated, e.g., using calibration values and/or a lookup table. Differences between the actual data values received from the downhole sensor 60 and the expected output values are calculated, and the differences are used to correct the output data. The output data can be corrected by correcting analog sensor outputs or digital signals derived from the analog sensor outputs.

Embodiments described herein present a number of advantages and technical effects. The systems and methods described herein allow for effective monitoring of temperature gradients in a device and correction of temperature gradient induced effects, by controlling temperature directly and/or by correcting data based on measured gradients. Such systems and methods improve the effectiveness of such devices by preventing potential damage and inaccuracies of data due to spatial temperature gradients.

For example, gyroscopic downhole north finding measurements generally require compact gyroscopes (MEMS) with low bias and scale factor instabilities. However, temperature gradients over a gyroscopic sensor assembly can cause different temperatures on the electronics and the sensor of the assembly, which results in a temperature dependent output (bias and/or scale factor). Embodiments described herein can reduce or eliminate such gradients or account for such gradients during analysis and processing, thereby correcting for temperature gradient influences on gyroscope signal instabilities.

In one such example of a monitored and thermally controlled device being a gyroscope, a gyroscope rate output can be stabilized using active temperature control of key components, such as the sensor head and electronic components, where temperature can exert a major influence on a rate output of the downhole sensor (e.g. stable voltage reference). Temperature stabilization and control is provided through a TEC cold-surface being in thermal contact with these key components (e.g., as shown in the above described illustrations). In the case of the sensor head, this can consist in mounting the sensor head onto a TEC and connecting the sensor head to the electronics board using a flex cable (e.g., as shown in FIGS. 2-3). Set points of all temperature controlled components can be chosen to have a constant (or zero) gradient. In some embodiments, temperature control can also be applied to the whole electronic circuitry at once.

Further, as discussed above, a signal output from a monitored device can be corrected based on the thermal gradients at the monitored device. For example, a gyroscope rate signal can be corrected using temperature readings and derived gradients and higher temperature spatial derivatives. This can be realized using the above described process. For example, measurement of the temperature of key components can be obtained using one or more temperature sensors. Subsequently, temperature gradients can be derived, and, in some embodiments, higher temperature spatial derivatives may be obtained. From such derivations, deduction through calibration, look-up tables, deployment of analytical functions (e.g., e-function, polynom, etc.), etc., an expected gyroscope rate output change from the measured and derived temperature profile can be obtained. From this, a correction to the gyroscope rate output may be performed. Such correction can be done by, for example, correcting an analog sensor rate output or a digital signal derived from the analog sensor rate output.

Advantageously, embodiments described herein employ liquid, solid, or phase-change media and/or material for heat transfer over an extent of a device (e.g., sensor assembly) in order to minimize temperature gradients. In some embodiments, wherein the device is a gyroscope, the gyroscope can be rotated inside a heat transfer liquid for indexing. Further, in some embodiments, a high thermal capacity of the medium can serve to further damp rapid temperature changes of the device. Further, embodiments described herein can be used to control temperature of device (e.g., sensor head and other key components) independently or separately so as to control the (known) effect of temperature gradients on the rate output signal. Moreover, embodiments described herein can be employed for measuring temperature on key spots of a monitored device (e.g., a sensor assembly) and a thermal profile can be derived and a correction to sensor rate output may be performed on analog or digital signals. Thermal profiles using the temperature gradient may be used in simulations (e.g., FEM) of the sensor in a given environment, such as a downhole component in a borehole exposed to elevated temperatures (e.g., a typical temperature range may be about 4° C. to about 300° C.).

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Embodiment 1

A system for measuring a parameter of interest in a borehole in an earth formation, the system comprising: a downhole sensor disposed at least one of in or on a downhole component; the downhole sensor comprising at least a first sensor component and a second sensor component, the first sensor component having a first temperature and the second sensor component having a second temperature; a temperature control system at least partially located in the downhole sensor, the temperature control system comprising: a thermal control mechanism, wherein at least one of the first sensor component and the second sensor component are operatively connected to the thermal control mechanism, wherein the thermal control mechanism is configured to maintain a temperature difference between the first temperature and the second temperature below a pre-determined temperature difference, and the downhole sensor is configured to measure the parameter of interest, using the first sensor component and the second sensor component, when the temperature difference is below the pre-determined temperature difference.

Embodiment 2

A system in accordance with the preceding described embodiment, wherein the first sensor component is a sensor head of a gyroscope sensor and the second sensor component is an electronics component, and the first sensor component and the second sensor component are in electrical communication using at least one of a wire, a fiber, and a wireless connection.

Embodiment 3

A system in accordance with any of the above described embodiments, wherein the thermal control mechanism comprises a thermally conductive material.

Embodiment 4

A system in accordance with the preceding described embodiment, wherein the thermally conductive material is a fluid, and the downhole sensor is submerged in the thermally conductive fluid, wherein the thermally conductive fluid is one of an oil, a liquid metal, and a polyglycol.

Embodiment 5

A system in accordance with the preceding described embodiment, further comprising at least one of (i) a pump configured to create a flow in the thermally conductive fluid, (ii) an agitator configured to create a movement of the thermally conductive fluid, and (iii) a motor configured to rotate at least a portion of the downhole sensor inside the thermally conductive fluid.

Embodiment 6

A system in accordance with the preceding described embodiment, the temperature control system further comprising a measurement unit configured to at least one of (i) measure the first temperature and the second temperature and (ii) measure a temperature gradient between the first sensor component and the second sensor component; and a controlling unit configured to control the at least one of the pump, the agitator, and the motor based on the at least one measured first temperature and second temperature and/or the measured temperature gradient.

Embodiment 7

A system in accordance with the preceding embodiment, wherein the thermally conductive material is a solid material and comprises at least one of aluminum, copper, aluminum nitride ceramics, and silicon carbide ceramics.

Embodiment 8

A system in accordance with the preceding embodiment, wherein the thermally conductive material is a phase change material and comprises at least one of paraffin, water, and alcohol.

Embodiment 9

A system in accordance with any of the above described embodiments, the temperature control system further comprising a measurement unit configured to at least one of (i) measure the first temperature and the second temperature and (ii) measure a temperature gradient between the first sensor component and the second sensor component, and the thermal control mechanism is a thermoelectric cooler (TEC); and a controlling unit configured to control the TEC, wherein the controlling unit uses one of the first temperature and the second temperature or a thermal gradient to control the TEC, and the controlling unit is configured to reduce the temperature difference between the first temperature and second temperature.

Embodiment 10

A system in accordance with the preceding described embodiment, wherein the controlling unit reduces the difference between the first temperature and the second temperature to less than 5 K or reduces the temperature gradient to less than 100 K/m.

Embodiment 11

A system in accordance with the preceding described embodiment, wherein the thermal control mechanism is a first thermal control mechanism operatively connected to the first sensor component, the temperature control system further comprising: a second thermal control mechanism operatively connected to the second sensor component, wherein the controlling unit is configured to control the first thermal control mechanism and the second thermal control mechanism.

Embodiment 12

A system in accordance with any of the above described embodiments, further comprising a container, wherein the temperature control system is housed within the container inside an inner bore of the downhole component.

Embodiment 13

A system in accordance with any of the above described embodiments, the temperature control system further comprising a temperature gradient sensor.

Embodiment 14

A system in accordance with any of the above described embodiments, further comprising an analysis unit configured to correct measurement data output from the downhole sensor based on the temperature difference between the first temperature and the second temperature.

Embodiment 15

A method for measuring a parameter of interest in a borehole in an earth formation using a downhole sensor, the method comprising: maintaining, using a temperature control system, a temperature difference or temperature gradient between a first temperature of a first sensor component of the downhole sensor and a second temperature of a second sensor component of the downhole sensor below a pre-determined temperature difference, and measuring the parameter of interest, using the downhole sensor, when the temperature difference is below the pre-determined temperature difference.

Embodiment 16

A method in accordance with the preceding embodiment, wherein the first sensor component is a sensor head of a gyroscope sensor and the second sensor component is an electronics component, and the first sensor component and the second sensor component are in electrical communication using at least one of a wire, a fiber, and a wireless connection.

Embodiment 17

A method in accordance with any of the above described embodiments, wherein the first sensor component and the second sensor component are disposed in a thermally conductive fluid, the method further comprising at least one of (i) pumping, using a pump, the thermally conductive fluid to create a flow therein, (ii) agitating, using an agitator, the thermally conductive fluid to create a movement therein, and (iii) operating a motor to rotate at least a portion of the downhole sensor inside the thermally conductive fluid.

Embodiment 18

A method in accordance with the preceding described embodiment, further comprising: measuring at least one of (i) the first temperature and the second temperature and (ii) a temperature gradient between the first sensor component and the second sensor component, using a measurement unit; and controlling the at least one of the pump, the agitator, and the motor based on the at least one measured first temperature and second temperature and/or the measured temperature gradient, using a controlling unit.

Embodiment 19

A method in accordance with any of the above described embodiments, further comprising: measuring the first temperature and the second temperature or a thermal gradient between the first sensor component and the second sensor component; and controlling a thermoelectric cooler (TEC) of the temperature control system based on one of the first temperature and the second temperature or the thermal gradient to reduce the temperature difference between the first temperature and second temperature.

Embodiment 20

A method in accordance with any of the above described embodiments, further comprising correcting, using an analysis unit, measurement data output from the downhole sensor based on the temperature difference between the first temperature and the second temperature.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

The invention claimed is:

1. A system for measuring a parameter of interest in a borehole in an earth formation, the system comprising:
    a downhole sensor disposed at least one of in or on a downhole component;
    the downhole sensor comprising at least a first sensor component and a second sensor component, the first sensor component having a first temperature and the second sensor component having a second temperature, and defining a first temperature difference or a temperature gradient, wherein the first sensor component is a sensor head of a gyroscope sensor and the second sensor component is an electronics component and wherein the sensor head defines a sensing portion of the gyroscope sensor and the electronics component is configured to at least one of provide stimulation signals to the sensor head, process output signals of the sensor head, and control switching-on and switching-off cycles;
    a first temperature sensor configured to measure the first temperature;
    a second temperature sensor configured to measure the second temperature; and
    a temperature control system at least partially located in the downhole sensor, the temperature control system comprising:
    a thermal control mechanism including a first side and a second side, wherein the first side and the second side are at different temperatures defining a second temperature difference different from the first temperature difference and wherein the first side is in thermal communication with at least one of the first sensor component and the second sensor component,
    wherein the thermal control mechanism is configured to maintain the first temperature difference or the temperature gradient between the first temperature and the second temperature below a pre-determined temperature difference or a pre-determined temperature gradient, respectively, using the second temperature difference, and
    the downhole sensor configured to measure the parameter of interest using the first sensor component and the second sensor component, wherein the first temperature difference is below the pre-determined temperature difference or the predetermined temperature gradient.

2. The system of claim 1, wherein the first sensor component and the second sensor component are in electrical communication using at least one of a wire, a fiber, and a wireless connection.

3. The system of claim 1, further comprising a conductor connecting the first sensor component to the second sensor component, wherein the conductor is one of a wire, a fiber, and a wireless connector.

4. The system of claim 3, wherein the conductor is configured to transmit signals between the first sensor component and the second sensor component.

5. The system of claim 1 further comprising a monitoring unit configured to monitor the first temperature difference for at least one of temperature monitoring, data quality monitoring, and temperature correction.

6. The system of claim 1, the temperature control system further comprising:
    a measurement unit configured to at least one of (i) measure the first temperature and the second temperature and (ii) measure a temperature gradient between the first sensor component and the second sensor component; and
    a controlling unit configured to control the thermal control mechanism based on at least one of the measured first temperature and second temperature and the measured temperature gradient.

7. The system of claim 6, wherein the controlling unit is configured to reduce the first temperature difference between the first temperature and the second temperature to less than 5 K or reduce the temperature gradient to less than 100 K/m.

8. The system of claim 6, wherein the thermal control mechanism is a first thermal control mechanism operatively connected to the first sensor component, the temperature control system further comprising:
    a second thermal control mechanism operatively connected to the second sensor component,
    wherein the controlling unit is configured to control the first thermal control mechanism and the second thermal control mechanism.

9. The system of claim 1, further comprising a container, wherein the temperature control system is housed within the container inside an inner bore of the downhole component.

10. The system of claim 1, the temperature control system further comprising a temperature gradient sensor.

11. The system of claim 1, further comprising an analysis unit configured to correct measurement data output from the downhole sensor based on the first temperature difference or temperature gradient between the first temperature and the second temperature.

12. The system of claim 1, wherein the first temperature sensor is connected in thermal communication with the first sensor component and the second temperature sensor is connected in thermal communication with the second sensor component.

13. A method for measuring a parameter of interest in a borehole in an earth formation using a downhole sensor, the method comprising:
    measuring a first temperature of a first sensor component of the downhole sensor with a first temperature sensor;
    measuring a second temperature of a second sensor component of the downhole sensor with a second temperature sensor, wherein the first sensor component is a sensor head of a gyroscope sensor and the second sensor component is an electronics component and wherein the sensor head defines a sensing portion of the gyroscope sensor and the electronics component is configured to at least one of provide stimulation signals to the sensor head, process output signals of the sensor head, or control switching-on and switching-off cycles;
    maintaining, using a temperature control system, a first temperature difference or a temperature gradient between the first temperature and the second temperature below a pre-determined temperature difference or a pre-determined temperature gradient, respectively, wherein the temperature control system includes a thermal control mechanism including a first side and a second side, wherein the first side and the second side are at different temperatures defining a second temperature difference different from the first temperature difference, wherein the first side is in thermal communication with at least one of the first sensor component and the second sensor component, wherein maintaining the first temperature difference includes using the second temperature difference, and
    measuring the parameter of interest, using the downhole sensor, wherein the first temperature difference is below the pre-determined temperature difference or the pre-determined temperature gradient.

14. The system of claim 1, further comprising a sensor container, wherein the sensor container is located inside the downhole component, and the first sensor component and the second sensor component are disposed within the sensor container.

15. The method of claim 13, wherein the first temperature sensor is connected in thermal communication with the first sensor component and the second temperature sensor is connected in thermal communication with the second sensor component.

16. The method of claim 13, wherein signals are transmitted between the first sensor component and the second sensor component using at least one of a wire, a fiber, and a wireless connection.

17. The method of claim 13, further comprising:
measuring at least one of (i) the first temperature and the second temperature and (ii) a temperature gradient between the first sensor component and the second sensor component, using a measurement unit; and
controlling the thermal control mechanism based on at least one of the measured first temperature and second temperature and the measured temperature gradient, using a controlling unit.

18. The method of claim 13, further comprising:
measuring the first temperature and the second temperature or a temperature gradient between the first sensor component and the second sensor component; and
controlling a thermoelectric cooler (TEC) of the temperature control system based on one of the first temperature and the second temperature or the temperature gradient to reduce the first temperature difference between the first temperature and second temperature.

19. The method of claim 13, further comprising correcting, using an analysis unit, measurement data output from the downhole sensor based on the first temperature difference or the temperature gradient between the first temperature and the second temperature.

20. The system of claim 1, wherein the sensor head is mounted onto the first side of the thermal control mechanism.

* * * * *